Figure 1:
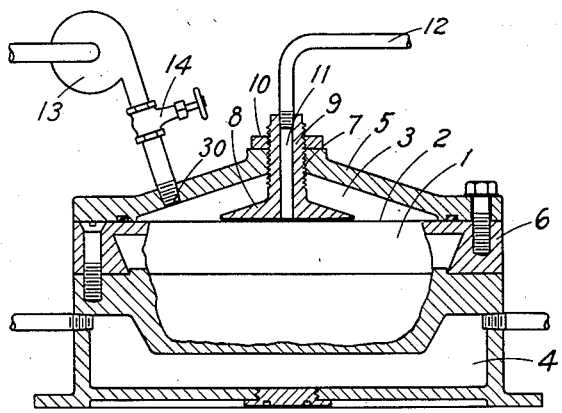

Nov. 29, 1938.   R. L. WILLIAMS   2,138,052
LIQUID TREATING APPARATUS
Filed April 23, 1934

INVENTOR
ROBERT L. WILLIAMS
BY
ATTORNEY

Patented Nov. 29, 1938

2,138,052

UNITED STATES PATENT OFFICE 2,138,052

LIQUID TREATING APPARATUS

Robert Longfellow Williams, Newton, Mass., assignor to Submarine Signal Company, Boston, Mass., a corporation of Maine Application April 23, 1934, Serial No. 721,867

2 Claims. (Cl. 99—234)

The present invention relates to a method of destroying bacteria or sterilizing liquid substances, such as milk, beer and other known liquids, which usually have a considerable amount of micro-organisms in them. These micro-organisms are sometimes classed in two groups; those which form clumps or chains, and those which do not group together in this fashion.

The present method is applicable to the destruction of both types of bacteria and accomplishes the bacteria reduction regardless of whether the clumps in the clump-forming type are broken up or not.

Various methods of killing bacteria have been tried in the prior art employing the use of compressional waves. In this method of obtaining bacteria reduction effort is particularly made to prevent cavitation of the liquid and the effect of such cavitation which has a tendency to disrupt the liquid surfaces of the medium and apparently break up the clumps or chains of bacteria where these are present as well as to cause emulsions in non-homogeneous liquids such as milk and the like. This method is also useful where gases are present in solution in the liquid and it is desired to retain them in the liquid. Beer and some forms of carbonated drinks are liquids which come into this class.

In the present method of obtaining bacteria reduction the pressure exerted upon the liquid is intensified to such a degree and varied so rapidly that a very few repeated vibrations will cause a destruction and complete disintegration of the bacteria cells.

In the system which I employ the liquid is forced in a very thin stream over a vibrating surface or diaphragm. The stream is so confined by a material of a much higher coefficient of elasticity than the liquid itself so that the full force of the varying pressure is impressed upon the liquid medium. While the actual compression of such liquids as milk, beer, etc., is not very great, still, however, it is about one hundred times as great as that of steel or iron or other such metals and therefore a large body of liquid offers or provides a medium which comparatively releases one hundred times as easily as that of the metals. On account of this phenomena the pressure built up in the very thin layer of liquid, backed on one side by a rigid metal surface, is very much greater than that built up by the same sound energy in the ordinary liquid medium, and by proper adjustment of the space and the amplitude of vibration of the vibratory surface, alternating pressure as great as the order of 10,000 atmospheres or more may be built up. The sudden variation of pressures from such magnitudes to zero and repeated a small number of times brings about a very rapid disintegration of the bacteria cells.

I have also discovered that by making the vibratory surface relatively large and by confining this surface by a plate opposite of substantially equal size, there is not sufficient time for the liquid between the two surfaces to escape before the pressure is applied. I have further discovered that by keeping the liquid under a small back pressure sufficient to force the liquid between the metal surfaces when the surfaces are withdrawing from one another, the activity and the application of the vibrational energy may be enhanced.

Figure 2:
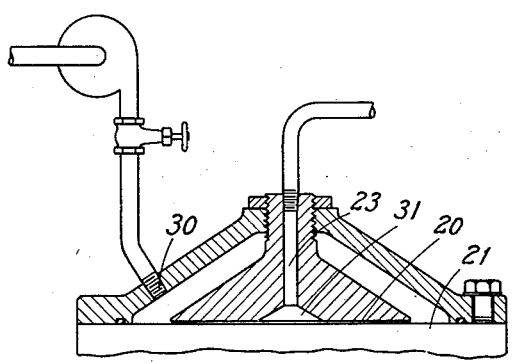

The present invention will be more readily understood from a consideration of the description of the apparatus employed together with the drawing in which Fig. 1 shows the apparatus partly in cross section for treating the liquid and Fig. 2 shows a modification of the apparatus shown in Fig. 1 used in the same method.

The apparatus shown in Fig. 1 is like that shown in my prior application Serial No. 674,020, filed June 2, 1933. This apparatus comprises an oscillator 1 which may be water-cooled by means of a water jacket 4 surrounding the oscillator and which is provided with a diaphragm 2 over which a chamber 3 is formed by means of a cover 5 attached to the oscillator through the heavy flange 6. The cover 5 has a threaded opening 7 at the center in which the nozzle or plate 8 is placed. This plate is provided with a neck 9 which is threaded through the opening and is locked in place by a lock nut 10 by which the nozzle or plate 8 may be positioned at the distance desired from the diaphragm 2.

The nozzle is provided with a passage 11 through the center thereof passing through the neck and connecting to the pipe line 12 which may be used either as an inlet or an outlet. The liquid may be forced into the chamber 3 through a pipe or opening 30 provided through the wall or cover of the chamber. A pressure may be provided at this opening either because of the head of the liquid standing in the pipe or by a pump 13 whose pressure can be regulated through a valve 14.

I have found by experiment that the nozzle or plate 8 should be provided with substantially a large flat surface positioned parallel to the surface of the diaphragm and placed at a distance approximately five thousandths of an inch therefrom for the best operation. In the preferable mode of operation the liquid is fed from the side of the chamber and forced between the diaphragm and the plate where it is acted upon by the vibration of the diaphragm at its point of maximum amplitude. The liquid is forced through the center passage 11 and it flows out through the pipe 12.

In the modification shown in Fig. 2 the plate or nozzle 20 is flat over its outer surface and positioned parallel to the diaphragm 21. At the center of the nozzle the opening is enlarged to the shape of a frustrated conical chamber 31 at the top of which is the passage 23 connecting with the external pipe line. This form of construction provides a more rapid flow for the liquid and under some conditions the pressure for forcing the liquids may be practically dispensed with.

The pressure, however, may in some cases, depending upon the spacing of the plate or nozzle from the diaphragm, be increased to cause the desired rate of flow of the liquid through the system. In the modification shown in Fig. 2 the liquid may be fed through the center opening and withdrawn from the side opening 30. In this case the maximum vibrational energy is impressed upon the liquid in the first part of its flow.

In the methods employed in the present invention the space between the surfaces of the plate and the diaphragm should be small as compared with the area of the diaphragm itself and should be of the order of five thousandths of an inch. The surface area of the plate is preferably, in the apparatus which I have employed, about twenty to thirty square inches and of such a shape as to obtain the largest surface for the smallest dimensions. Under these conditions with amplitudes of the order of two or three thousandths of an inch for the vibrating surface the pressures are periodically increased to the order of 10,000 atmospheres or greater at frequencies within the sonic range.

In particular the active surface of the diaphragm and the plate opposite it should extend a sufficient distance so that the liquid between the plate and the surface shall not have an opportunity of escaping during the invidual vibrations. If the diaphragm has an active diameter of approximately ten inches and the plate on top of it covers substantially this area I have found that about 80% of the liquid confined between the surfaces remains there and is acted upon by the full compression of the vibratory energy.

Under ordinary conditions of operation of the apparatus above described with the frequency of about 500 vibrations per second and with an amplitude of the vibratory diaphragm approximately that attained in submarine signaling in water, a pressure as great as 100,000 atmospheres may be built up and this pressure will alternate at the rate of 500 times per second.

Having now described my invention, I claim:

1. An apparatus for destroying bacteria contained in a liquid by means of compressional wave vibrations comprising, in combination, an oscillator having a vibratory surface of an area comparable in surface dimensions to the wave length in the liquid passing over the surface vibrated, means positioned, opposed and in face to face relation with said vibratory surface forming thereby a flat surface, the space between the vibratory surface and the opposing surface being 5/1000ths of an inch forming thereby a very thin channel between the surfaces, means for conducting a liquid through said channel from the outer edges of the same and means for withdrawing the same at the center of the said upper surface whereby high differential pressures are obtained within the channel by the vibrations of the surfaces thereof.

2. An apparatus for destroying bacteria contained in a liquid by means of compressional wave vibrations comprising, in combination, an oscillator having a vibratory surface over which the liquid is adapted to flow, said surface being comparable in surface dimensions to the wave length of the vibrations in the liquid, a cover formed over said vibratory surface providing a second surface opposed to said vibratory surface and positioned at a distance approximately 5/1000ths of an inch therefrom, and means providing an inlet to the opening between the two surfaces about the edges thereof and an outlet through the center of the second surface.

ROBERT LONGFELLOW WILLIAMS.